United States Patent
Nandagopal

(10) Patent No.: US 9,256,869 B2
(45) Date of Patent: *Feb. 9, 2016

(54) AUTHENTICATION AND VERIFICATION SERVICES FOR THIRD PARTY VENDORS USING MOBILE DEVICES

(71) Applicant: Alcatel Lucent, Boulogne-Billancourt (FR)

(72) Inventor: Thyagarajan Nandagopal, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,771

(22) Filed: Jan. 12, 2015

(65) Prior Publication Data

US 2015/0154586 A1  Jun. 4, 2015

Related U.S. Application Data

(63) Continuation of application No. 11/345,695, filed on Feb. 2, 2006, now Pat. No. 8,934,865.

(51) Int. Cl.
*H04M 3/42* (2006.01)
*G06Q 20/32* (2012.01)
(Continued)

(52) U.S. Cl.
CPC ............ *G06Q 20/3229* (2013.01); *G06Q 20/10* (2013.01); *G06Q 20/32* (2013.01); *G06Q 20/322* (2013.01); *G06Q 20/325* (2013.01);
(Continued)

(58) Field of Classification Search
CPC ....... H04W 12/06; H04W 8/245; H04W 4/14;
H04W 72/005; H04W 80/04; H04L 29/08108;
H04L 2012/5607; H04L 63/05; G07F 7/10;
G07F 7/1075; G06Q 20/423; G06Q 20/32;
G06Q 20/322; G06Q 20/325; G06Q 20/347;
G06Q 20/47
USPC ...................... 455/411, 414.1, 418–420, 466;
370/310.2, 312, 328; 715/202; 705/39, 705/64; 713/168
See application file for complete search history.

(56) References Cited

U.S. PATENT DOCUMENTS 6,610,105 B1  8/2003  Martin et al.
6,731,731 B1  5/2004  Ueshima
(Continued)

FOREIGN PATENT DOCUMENTS

EP  1 065 634 A1  1/2001
EP  1 443 475 A1  8/2004
(Continued)

OTHER PUBLICATIONS

International Search Report and Written Opinion in corresponding PCT/US2007/002996, Jul. 2007, Lucent Technologies Inc.
(Continued)

*Primary Examiner* — Steve D Agosta
(74) *Attorney, Agent, or Firm* — Wall & Tong, LLC

(57) ABSTRACT

A method to provide authentication services to third party vendors by a service provider hosting an authentication, authorization and accounting (AAA) server or a similar device that can authenticate users for some other service. This method enables easy and substantially error-free end-user authentication, which forms the basis for enabling electronic transactions (e.g., web-based) that are less vulnerable to fraud.

18 Claims, 8 Drawing Sheets

(51) Int. Cl.
  *G06Q 20/34* (2012.01)
  *G06Q 20/42* (2012.01)
  *G07F 7/10* (2006.01)
  *G06Q 20/10* (2012.01)
  *G06Q 20/40* (2012.01)
  *H04W 12/06* (2009.01)

(52) U.S. Cl.
  CPC .......... *G06Q20/3227* (2013.01); *G06Q 20/347* (2013.01); *G06Q 20/4014* (2013.01); *G06Q 20/42* (2013.01); *G06Q 20/425* (2013.01); *G07F 7/10* (2013.01); *G07F 7/1075* (2013.01); *H04W 12/06* (2013.01)

(56) References Cited

U.S. PATENT DOCUMENTS

| | | | |
|---|---|---|---|
| 6,980,970 | B2 | 12/2005 | Krueger et al. |
| 7,043,635 | B1 | 5/2006 | Keech |
| 2002/0059146 | A1 | 5/2002 | Keech |
| 2004/0203595 | A1 | 10/2004 | Singhal |

FOREIGN PATENT DOCUMENTS

| | | |
|---|---|---|
| EP | 1 538 571 A | 6/2005 |
| FR | 2 812 424 A | 2/2002 |
| JP | 2001-45562 | 2/2001 |
| JP | 2001-283121 | 10/2001 |
| KR | 2003-0036766 | 5/2003 |
| WO | WO 01/55984 A | 8/2001 |
| WO | WO 02/21463 A2 | 3/2002 |
| WO | WO 03/015043 A | 2/2003 |
| WO | WO 2005/001670 A2 | 1/2005 |
| WO | WO 2005/024677 | 3/2005 |

OTHER PUBLICATIONS

Nov. 9, 2010 Office Action in CN 200780004215.9, Lucent Technologies Inc. Applicant, 3 pages.

Dec. 27, 2011 Office Action in CN 200780004215.9, Lucent Technologies Inc. Applicant, 3 pages.

Sep. 5, 2012 Office Action in CN 200780004215.9, Lucent Technologies Inc. Applicant, 3 pages.

Jan. 4, 2013 Office Action in CN 200780004215.9, Lucent Technologies Inc. Applicant, 4 pages.

Feb. 13, 2012 Office Action in JP 2008-553390, Alcatel-Lucent USA Inc., Applicant 4 pages.

Dec. 18, 2012 Office Action in JP 2008-553390, Alcatel-Lucent USA Inc., Applicant 5 pages.

Mar. 27, 2013 Office Action in KR 10-2008-7018267, Alcatel-Lucent USA Inc., Applicant, 4 pages.

AUTHENTICATION AND VERIFICATION SERVICES FOR THIRD PARTY VENDORS USING MOBILE DEVICES

CROSS-REFERENCE TO RELATED APPLICATIONS

This application is a continuation of U.S. patent application Ser. No. 11/345,695 filed on Feb. 2, 2006, AUTHENTICATION AND VERIFICATION SERVICES FOR THIRD PARTY VENDORS USING MOBILE DEVICES, which is hereby incorporated herein by reference.

FIELD OF THE INVENTION

The present invention relates generally to the fields of communication protocols and internetworking and, in particular, relates to security, authentication, e-commerce, wireless networks, buyers and sellers, and mobile computing.

BACKGROUND OF THE INVENTION

Vendors would prefer to improve the shopping experience for consumers by making purchase transactions more secure, without forcing consumers to swipe their credit cards and provide identification to verify their identities. Also, fraud and identity theft have become pervasive problems.

Traditional world wide web electronic transactions involve the keying of an end-user's name and credit/debit card number with some associated auxiliary security verification information (ASVI) (e.g., the card verification value (CVV) number, user address, billing zip code, year of birth of the user, etc.) into a vendor's webpage for billing. The vendor passes this information to the transaction handler (or payment gateway), who verifies the authenticity of the provided information and conveys the result to the vendor. The vendor then completes the transaction by billing the user.

While the ASVI information is supposed to be known only to the end-user, practical constraints force the user to have a fixed set of this information. This information could be knowingly or inadvertently stored at many points in the network by some vendors with whom the user has transacted in the past. In addition, ASVI information is stored by the transaction handler (or payment gateway). This data is, therefore, more vulnerable to theft and compromise. The identity of the user can be impersonated by anyone in possession of the ASVI information in addition to the credit/debit card information.

SUMMARY

Exemplary embodiments of the present invention provide authentication and verification services for third party vendors using mobile devices, eliminating the need for the vendor to solely rely on the ASVI information in order to authenticate the user.

One embodiment is a method for performing authentication. A name and a mobile device identifier are received from a vendor. It is verified that the name received from the vendor is the same as the name of the owner of the mobile device that was identified by the mobile device identifier. A new data string is generated and the same data string is sent to both the vendor and the mobile device. The user's identity is verified by determining that the data string received by the vendor is the same as the data string received by the mobile device. Another embodiment is a computer readable medium storing instructions for performing this method.

In another embodiment of a method for performing authentication, a name and a mobile device identifier are received from a vendor. It is verified that the name received from the vendor is the same as the name of the owner of the mobile device that was identified by the mobile device identifier. A data string is sent to the mobile device, which is passed to the vendor. The data string can be randomly generated. Then, the same data string is received from the vendor. The user's identity is verified by determining that the two data strings are the same. Another embodiment is a computer readable medium storing instructions for performing this method.

In yet another method for performing authentication, a first data string is sent to a mobile device. A name, a mobile device identifier, and a second data string are received from a vendor. It is verified that the name received from the vendor is the same as the name of the owner of the mobile device that was identified by the mobile device identifier. The user's identity is verified by determining that the first data string is the same as the second data string that was sent to the mobile device. Another embodiment is a computer readable medium storing instructions for performing this method.

In still another method for performing authentication, a name, a mobile device identifier, and a set of transaction information is received from a vendor. It is verified that the name received from the vendor is the same as the name of the owner of the mobile device that was identified by the mobile device identifier. The transaction information is sent to the mobile device, which can be optionally verified by the user. Another embodiment is a computer readable medium storing instructions for performing this method.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1:
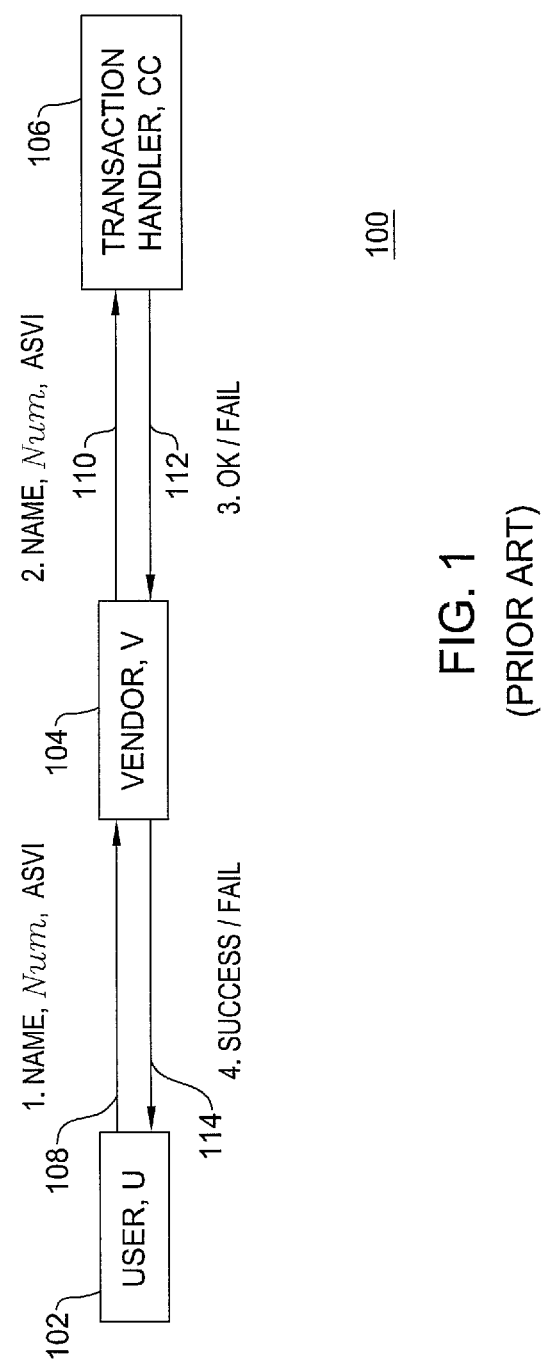
FIG. 1 is a block diagram that shows a traditional electronic transaction.

The present invention will be primarily described within the general context of embodiments of methods and system for authentication and verification services for third party vendors using mobile devices. However, those skilled in the art and informed by the teachings herein will realize that the invention is generally applicable to any kind of device capable of receiving information (e.g., personal digital assistants, laptops, cell phones, mobile or portable device, or other computing devices), authentication service, authorization service, accounting service, verification service, automatic or manual billing service, security application, transaction types, selling, buying, shopping, sellers, vendors, merchants, shops, websites, buyers, consumers, banks, credit cards, other commercial and financial entities, and any other devices, services, and types of networks.

There must be a better way for vendors to improve the shopping experience for consumers by making transactions faster and easier, without forcing consumers to swipe their cards and provide identification to verify their identities. Also, fraud and identity theft have become pervasive problems. At the same time, most people now always carry mobile phones or other portable devices. Increasingly, mobile phones and other portable devices have more and more functionality. In the case of identity theft, the thief has access to the user's information (e.g., credit card number) but the user is not aware that the thief has access. However, nobody can use a mobile device unless they have actual physical possession of the mobile device. A mobile phone is one example of such a mobile device. Like a driver's license, a mobile phone is something a person always has in his or her possession and, thus, is available for identification purposes. If it were just a number, like a social security number, anyone could use it just by knowing the number, without having possession of the physical social security number card. The mobile phone is in close physical proximity with the user. Unlike a passive driver's license, the mobile phone and other mobile devices not only provide identification, but also send and receive information, such as text messages.

One exemplary embodiment is a method for providing authentication services to third party vendors that eliminates the need for a vendor to solely rely on ASVI information in order to authenticate the user. Authentication services are provided by a service provider hosting an authentication, authorization and accounting (AAA) server, a billing records server, or a similar device to authenticate users for some other service. This enables easy and substantially error-free end-user authentication that forms the basis for enabling electronic transactions (e.g., web-based) and other services that are less vulnerable to fraud.

Consider a transaction in a supermarket where a counter-clerk visually authenticates a user using his photo identity card (e.g., driver's license) as an authentication mechanism in addition to the ASVI information. Another authentication mechanism that is available in exemplary embodiments for a user that always carries a mobile device. The mobile device is served by a service provider. The service provider may provide wireless service or some connectivity or other service to the user. Alternatively, the service provider may be a third party providing authentication and verification service for a vendor. For example, a corporate entity may provide email service to the user. The service provider has an authentication server, typically as part of an AAA server that authenticates the mobile device carried by the user. Specifically, the user account is associated with the user's name (and optionally the user's address) and information and an identifier specific to the mobile device, (e.g., subscriber identity module (SIM) or electronic serial number (ESN)). Whenever the mobile device is connected to the network of the service provider, this authentication can be performed and periodically verified. Of course, the user needs to immediately notify the service provider if the mobile device is stolen or lost.

FIG. 1 shows a traditional electronic transaction 100 between a user (U) 102 and a vendor (V) 104 (e.g., a grocery store, an e-commerce store, a billing agent, or any person or organization that accepts an alternative payment in lieu of cash) via a transaction handler (CC) 106, (e.g., a bank, a credit card company, a payment gateway, or any entity handling and verifying financial transactions, or a combination of these). In step 1, the user 102 sends his name and optionally his address, both of which are denoted by "NAME" in FIG. 1, and account number denoted by "Num" (e.g., the credit/debit card number, or other account number) along with the ASVI information 108 (e.g., the card verification value (CVV) number, billing address, billing zip code, year of birth of the user, etc.) to the vendor 104, who passes this information 110 to the transaction handler 106 in step 2. This information 110 is verified by the transaction handler, who sends an okay or fail message (step 3) 112 to the vendor 104 regarding the authenticity of the billing information provided and, in addition, the authenticity of the user credentials, (not the authenticity of the user). Upon receiving the message 112, the vendor 104 successfully processes the transaction (step 4) 114 and subsequently provides the service(s) to the user 102.

One problem with the traditional electronic transaction 100 is that the user 102 could be faking the credentials (i.e., account number and ASVI information) and both the vendor 104 and the transaction handler 106 are powerless to detect it. Additional authentication involves storage of more personal information about the user 102, such as biometric data. However, most additional authentication is either prohibitively expensive, or not portable, or not easy to use, or significantly erodes the privacy of the user 102. Even this additional authentication is subject to abuse, because this information is usually stored at the transaction handler 106 and, hence, can be stolen. A public key infrastructure (PKI) can be used for end-user authentication, where the user 102 encodes his information with his private key. However, PKI is not used pervasively by any party in traditional electronic transactions, due to its inconvenience and privacy considerations.

In the traditional electronic transaction 100, the authentication service is provided by the transaction handler 106. Again, the transaction handler 106 authenticates only user credentials, not the user. There is a need for an authentication service that is separate from the transaction handler, which provides more control for the vendor, helping the vendor 104 verify the identity of user 102. ASVI information is often stored in a database by the transaction handler. So, a thief could steal the ASVI information in the database and pretend to be a user in a transaction with a vendor. When the fraud comes to light, the vendor is stuck with all the fraudulent charges. By contrast, exemplary embodiments add an additional authentication mechanism that is substantially simple, fool-proof, and easy to use. One such exemplary embodiment is outlined in FIG. 2.

Figure 2:
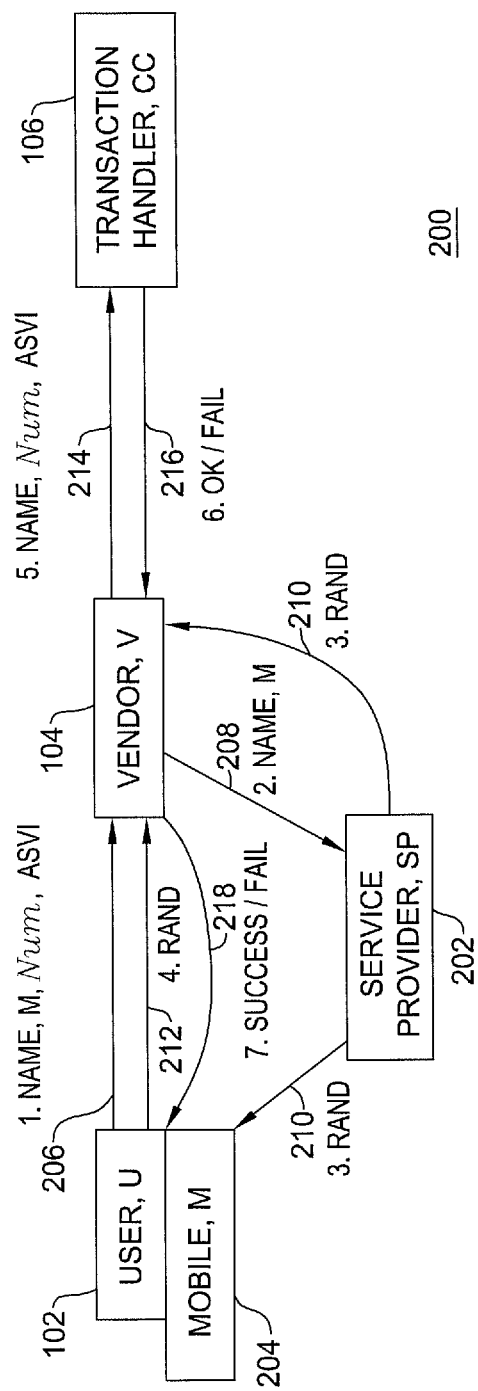
FIG. 2 is a block diagram that shows an exemplary embodiment of a method for authentication and verification services for third party vendors using mobile devices.

FIG. 2 shows an exemplary embodiment 200 of a method for authentication and verification services for third party vendors using mobile devices. This exemplary embodiment introduces a third party, the service provider (SP) 202 and a third party authentication service that can be used by a vendor (V) 104. In this exemplary embodiment, the user (U) 102 sends his name, (optional address) number, and ASVI information 206 as usual, but also sends the identity of the mobile device (M) (e.g., M=cell phone number, SIM card number, or ESN number) to the vendor (V) 104 (step 1 206). The vendor identifies the service provider 202, which can authenticate M and sends the service provider the information (step 2 208), i.e., name (optional address) and M. The vendor sends this information with equipment, such as a cash register machine, a personal computer (PC), a credit card verification machine, or a standalone device. This equipment is provided to the vendor by the service provider, in one embodiment. In another embodiment, the information is transmitted electronically by the vendor to the service provider. The service provider 202 checks if the identity of the mobile device, M, is authenticated against a user with the same name (and optionally address) as user 102. In other words, the service provider checks that the person with that name (and optionally address) is the same person who owns the mobile device identified by M. If so, then the service provider sends the mobile device 204 and the vendor a data string of information, rand, (step 3 210). In another embodiment, the data string can be generated at random by the service provider.

The data string is not stored and is generated at this point in each transaction. The data string does not necessarily follow any pattern, but this exemplary embodiment does not preclude that. However, a data string affords more security. The data string can be any sequence of characters, numbers, images, sounds, or any randomly chosen piece information capable of being sent from the service provider and received by both the mobile device 204 and the vendor 104.

The user 102 receives the data string on his mobile device 204 and, then, sends the data string to the vendor 104 (step 4 212). The vendor 104 verifies this with the string received from the service provider (previously in step 3 210) and if it matches, then the vendor 104 is assured that the user 102 is indeed in possession of his registered mobile device 204 and, therefore, who he claims to be according to the service provider 202. Now, the vendor 104 proceeds with the rest of the transaction with the transaction handler 106. If that part of the transaction succeeds as well, the vendor 104 has authenticated the user 102 using two independent methods: one using a physical validity test (using the mobile device 204) and the other using a traditional financial validity test (using the transaction handler 106).

Any thief wishing to fake the identity of the user 102 will have to compromise not only the account number, name, and ASVI, but also physically compromise the mobile device 204. The knowledge of the mobile identifier, M, or the data string cannot help the thief, because the data string changes with every transaction, i.e., it is unique for each transaction. Thus, vendors 104 can rely on the physical proximity of the mobile device 204 to their owners (user 102) in order to verify their identity by an additional, independent means.

For example, a user walks into a Starbucks and uses a credit card to purchase a coffee drink. The user gives his name and cell phone number to the cashier and quickly receives a text message from his cell phone provider with the code "9945". The cashier also receives "9945" on the cash register machine. The user tells the cashier the code so that the cashier knows that the user is the same person associated with the cell phone number. The cashier sends the user's name, credit card number, and other information to the credit card company and completes the sale in the usual way.

Now, suppose the user drops his credit card on the way out and a thief picks it up and goes to the Starbucks counter and attempts to use the user's credit card number for a purchase. The cashier asks the thief for his name and cell phone number. If the thief gives the user's cell phone number, then the thief will not receive the message, because the user is in possession of the cell phone. If the thief gives his own name and his own cell phone number, his name and cell phone number are not going to match the name on the credit card during authentication. If the user gives the stolen name, stolen credit card information and his own cell phone number, then the name and phone number will fail verification by the service provider. Thus, a thief cannot fake either the user's name and the user's cell phone number or both and expect to get away with it. A fraudulent transaction will fail either at the service provider 202 or the transaction handler 106 so, the vendor 104 has two opportunities to detect the fraud.

Electronic commerce transactions can also be handled in a similar manner. When a user's purchase information is stolen and misused by someone else, the coupling of the mobile device identity with the financial information prevents misuse and financial fraud.

This exemplary embodiment provides a different authentication mechanism 200 that allows a service provider 202 to give a data string 210 to a mobile device 204 to control the mobile device 204 in response to a request from a vendor 208, from whom the user 102 requests some service in exchange for a payment. Communication of the data string, rand, to the mobile device 204 can be performed via a data channel or a control channel. In general, messaging involving the mobile device 204 may be over a data channel or a control channel. The data channel may be used for a text message, voice prompt, multimedia message and the like. In one embodiment, messages are presented on the mobile device 204 with a menu for authentication and verification services. Some examples of messages include short message service (SMS), text, instant messaging, video messaging, multi-media messaging, voice-activated speech, human confirmation and the like. Messages over a control channel have separate signaling. The control channel may be a dedicated control channel.

Figure 3:
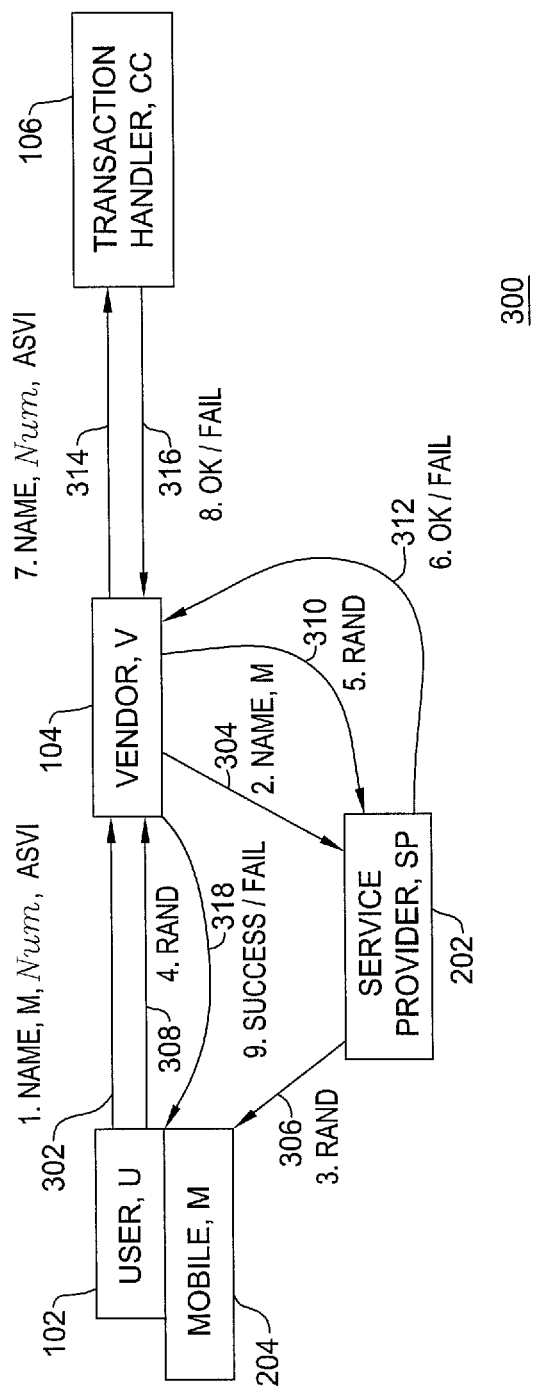
FIG. 3 is a block diagram that shows another exemplary embodiment of a method for authentication and verification services for third party vendors using mobile devices.

FIG. 3 shows another exemplary embodiment of a method for authentication and verification services for third party vendors using mobile devices. This exemplary embodiment performs a similar set of transactions, but here the service provider 202 sends the data string only to the mobile device 204 and this information is given to the vendor 104 by the user 102, who receives it on his mobile device 204. The first and second steps 302, 304 are the same as those 206, 208 in FIG. 2. In the third step 308, the service provider 202 sends the data string to the user 102 directly. Then, the user 102 sends the data string to the vendor 104 (step 4 308), who forwards it to the service provider 202 (step 5 310) and the service provider verifies whether the data string is correct and notifies the vendor (step 6 312). Here, the responsibility for verifying the data string is correct lies with the service provider 202, rather than the vendor 104, as in FIG. 2. The remaining steps 314, 316 are similar to those 214, 216 in FIG. 2.

Figure 4:
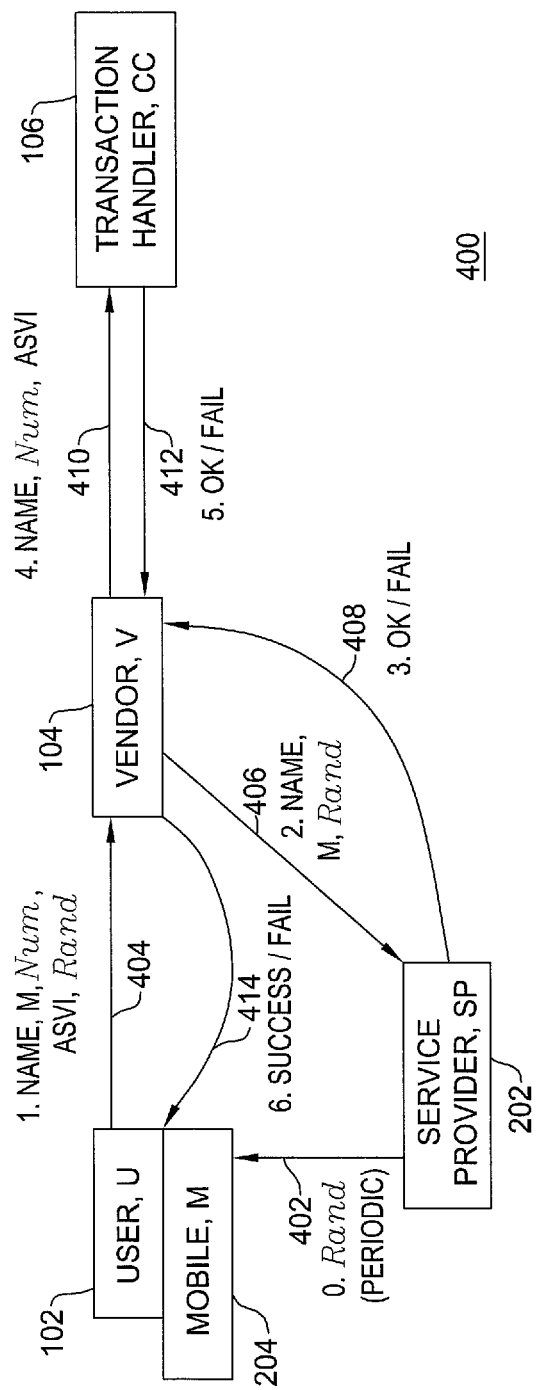
FIG. 4 is a block diagram that shows yet another exemplary embodiment of a method for authentication and verification services for third party vendors using mobile devices.

FIG. 4 shows yet another exemplary embodiment of a method for authentication and verification services for third party vendors using mobile devices. In this exemplary embodiment, in step 0 402, the service provider 202 sends a different data string periodically to the mobile device 204 of every registered user 102 in its network. This information is sent by the user 102 (step 1 404) as part of the transaction to the vendor 104 in addition to the name, mobile number (M), and ASVI information. The vendor 104 sends the name, mobile number, and ASVI information to the service provider 202 (step 2 406) for verification and, upon successful verification (step 3 408), proceeds with the rest of the transaction (steps 4 and 5 410, 412). In an alternate embodiment, the user 102 explicitly requests a data string from the service provider 202 before initiating a transaction, eliminating the need for the service provider 202 to periodically generate data strings for all the devices in its network. This exemplary embodiment may be faster (i.e., decreased transaction time) and more efficient than that shown in FIG. 3, because it has fewer steps (six vs. nine) and less overhead.

Communication between the vendor 104 and the service provider 202 can be either direct or via an authentication broker (not shown), who handles transactions between numerous vendors and various service providers. The broker can provide services to identify the mapping between a mobile device number (M) and its authentication service provider 202 and route the requests and responses appropriately to the correct vendor 104 and service provider 202.

The responsibility for authenticating the user lies primarily with the vendor 104, in the exemplary embodiments shown in FIGS. 1-4, which reflects practical constraints in the current world of electronic commerce. Vendors are not compensated for fraudulent charges made by compromised credit cards.

One advantage of exemplary embodiments lies in both the ubiquity of mobile devices that are associated with a centrally controlled network and in the fact that mobile devices 204 are carried by nearly everyone, thereby removing the need to carry a separate authentication device, such as a smart card. By separating the mobile device 204 interaction from the financial aspect of the transaction problem, the potential for abuse of stolen mobiles is reduced, because a thief would have to steal the device as well as the financial instrument information (e.g., credit/debit/smart card) and the ASVI for that instrument and user 102. While the latter information can be centrally stored, the mobile device state cannot be stored in the same place, stolen or replicated successfully by a thief who wants to masquerade as the user 102.

Figure 5:
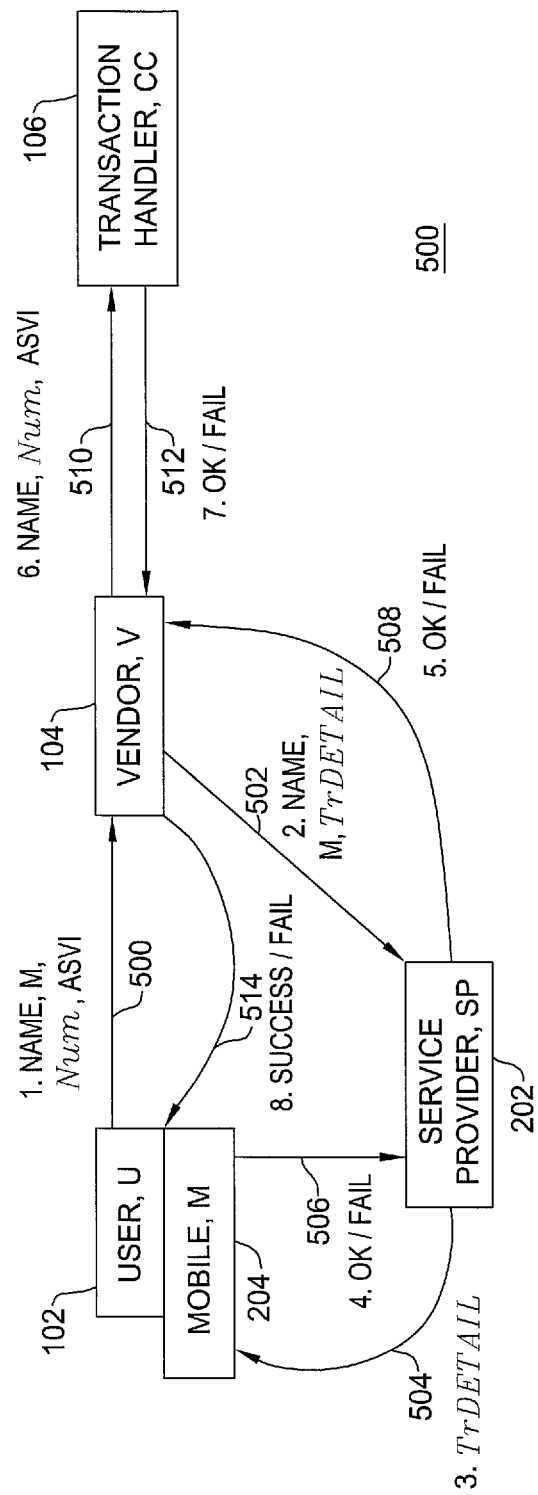
FIG. 5 is a block diagram that shows still another exemplary embodiment of a method for authentication and verification services for third party vendors using mobile devices.

FIG. 5 shows still another exemplary embodiment of a method for authentication and verification services for third party vendors using mobile devices. This exemplary embodiment illustrates providing verification services and is useful for applications where details about the transaction are available. For example, users 102 can use this service to verify details about the transaction, (e.g., what is being charged to his or her credit card). As part of verifying the identity of the user 102 during a transaction using his or her mobile number, the vendor 104 sends some transaction information, TrDetail, to the service provider 202 (step 2 502).

The TrDetail may include information about the vendor 104, the name of the user making the transaction, the items or services involved in the transaction, the cost of the transaction, or other information related to the transaction. In one embodiment, the message sent in step 3 504 to the mobile device 204 may server as a receipt for the user 102.

After authenticating the user 102 via his or her mobile device registration, the service provider 202 sends the TrDetail information to the mobile device 204 (step 3 504). The user 102 can cross-check this information and send an okay or fail message back to the service provider 202 about the transaction (step 4 506). All messages are identified by an ID number that is unique, at least for each transaction. The ID number is included in each message, enabling the service provider 202 and the vendor 104 to track the progress of the authentication and verification. If the user 102 verifies the transaction (step 4 506), then the service provider 202 passes this information to the vendor 104 (step 5 508) and the transaction proceeds as before (steps 6 and 7 510, 512). There is no data string involved in this exemplary embodiment.

In one exemplary embodiment, a user→mobile device→service provider→vendor pathway is used to pass the ASVI information to the vendor 104, as opposed to sending the information directly to the vendor 104. This advantageously provides two near-independent pathways (independence is either in space or time or both) for transmittal of secure financial information.

Consider a user 102 who has multiple copies of a credit card, one for himself, one for his spouse, and one for each child. This exemplary embodiment enables the user 102 to have some control over what is being charged to the credit card by his spouse and children. The user 102 can maintain possession of the mobile device 204 and, therefore, either approve or disapprove each purchase in step 4 506, after receiving the transaction detail information in step 3 504.

In another scenario, suppose the user 102 and his spouse share a credit card and each has a different mobile device 204. The service provider sends the transaction detail message in step 3 504 to the mobile device 204 owned by the purchaser, or to each mobile device 204 for approval in step 4 506, as desired. For example, they might set up the service or account to allow each spouse a veto power over purchases, one spouse may have approval rights for all purchases, or each may approve their own purchases.

Figure 6:
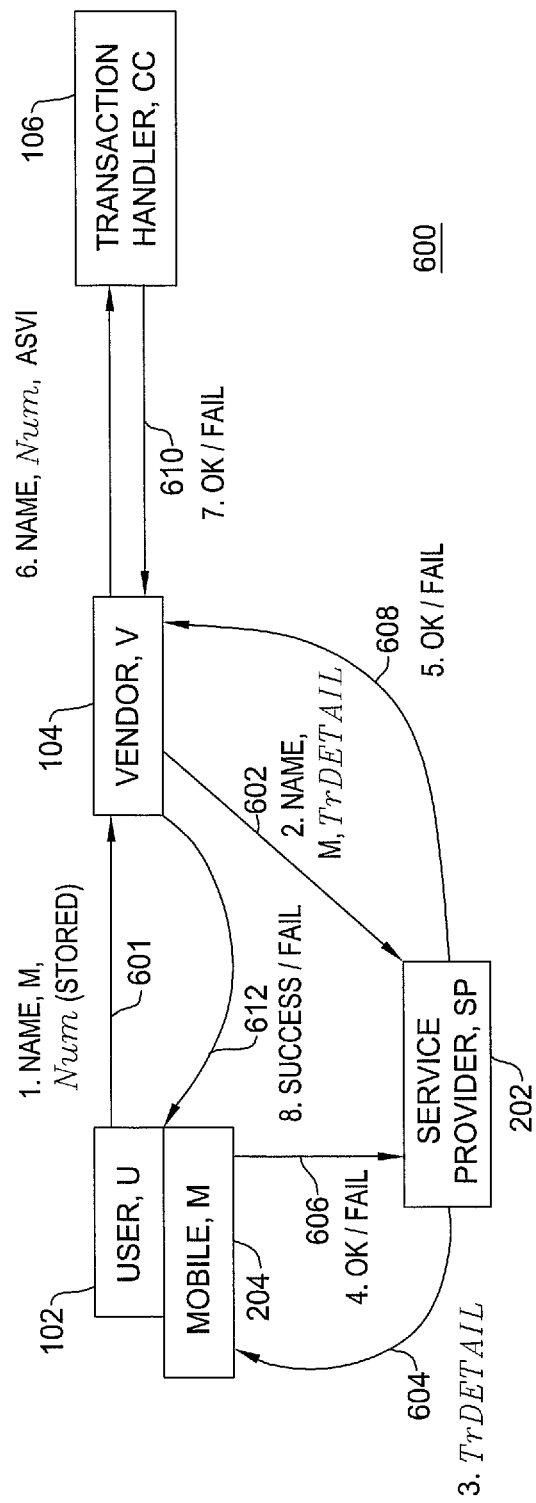
FIG. 6 is a block diagram that shows an exemplary embodiment of a method for automatic billing services with user verification for third party vendors using mobile devices.

FIG. 6 shows an exemplary embodiment of a method for automatic billing services with user verification for third party vendors using mobile devices. A verification service can be used to ensure that users registering for periodic or automatic billing services are notified and billed only upon their verification (at least initially or until a due date), among other applications. In this exemplary embodiment, the vendor 104 uses pre-stored information, which can also include ASVI or can be obtained from the user as part of the verification process. The vendor 104 uses pre-stored information (step 1 600) to initiate a periodic or automatic transaction. The user 102 is notified, after having the identity authenticated by the service provider 202 (with the mobile device 204) of the TrDetail. The rest of the method is similar to the method described with reference to FIG. 5.

For example, a vendor sends a bill, (e.g., electric or water bill) as transaction detail information in step 3 604 for approval before debiting your bank account. Receiving a message on the mobile device 204 and pressing OK before a due date is more convenient for the user 102 than logging on to a website or having to write a check.

For example, a vendor sends transaction detail indicating that the user 102 has been billed in step 3 604 for an automatic billing service (e.g., phone bill). This automatic payment is not dependent on approval. The first time the automatic billing service is set up, approval may be required. Thus, step 4 606 is optional.

Figure 7:
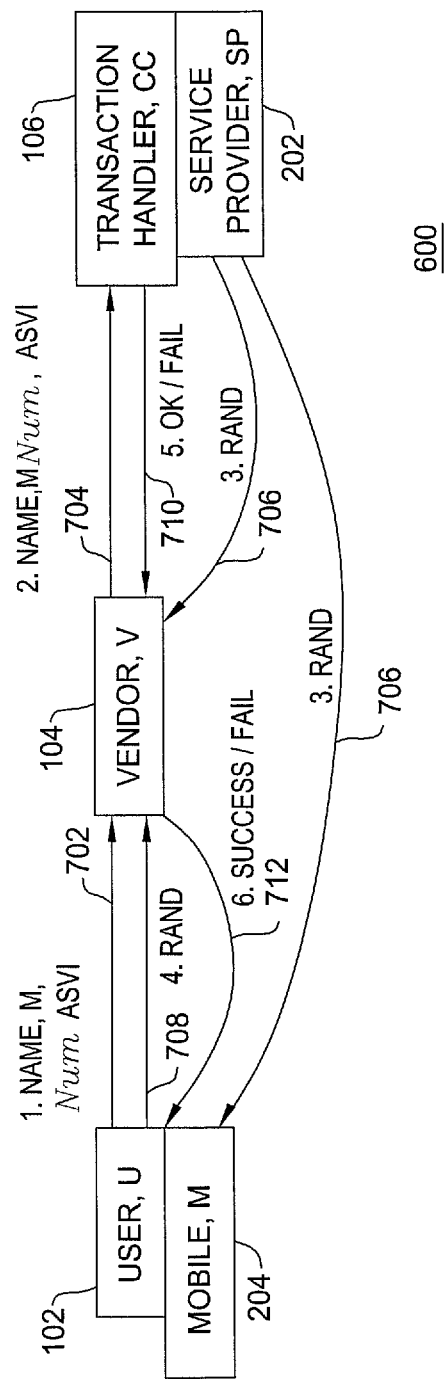
FIG. 7 is a block diagram that shows yet another exemplary embodiment of a method for authentication and verification services.

FIG. 7 shows yet another exemplary embodiment of a method for authentication and verification services. In this exemplary embodiment, the authentication and verification services are provided by the transaction handler 106, instead of the service provider 202, as in other embodiments. In this embodiment, the service provider 202 can be located at either the payment gateway that routes the information to the appropriate financial network or the company that verifies the credit/debit card information, or the bank that processes the final payment, all of which are represented in FIG. 7 by transaction handler 106. The methods shown in FIGS. 2, 3, 4, 5, and 6 can be adapted to this model, where the service provider functions are provided by one of the component entities of the transaction handler 106. The number of transaction steps in this embodiment is less than if the service provider were an independent entity. The mobile identifier, M, is registered by the user 102 at a time prior to the transaction, such as when the user obtains or activates the credit/debit card, "Num" and stored (in a storage device, such as a database, which is not shown) by the transaction handler 106 in association with the user's information for later verification.

At 702 (step 1), the user 102 sends his name, (optional address), M, Num, and ASVI information to the vendor 104, who passes it onto the transaction handler 106 at 704 (step 2). At 706 (step 3), the service provider 202 sends the data string, rand, to both the vendor 104 and the user 102. The data string may be randomly generated. At 708 (step 4), the user provides the data string to the vendor 104. At 710 (step 5), the transaction handler 106 provides an okay or fail message based on whether the user information was the same as the registration information stored prior to the transaction. At 712 (step 6), the vendor 104 notifies the user 102 whether the transaction succeed.

In one exemplary embodiment, the mobile device identifier, M, is received by an inquirer, such as the vendor 104, service provider 202, or transaction handler 106. The mobile device identifier is associated with one or more identities and other data (e.g., name, address, account number). The identity is provided for use in authenticating a transaction.

Figure 8:
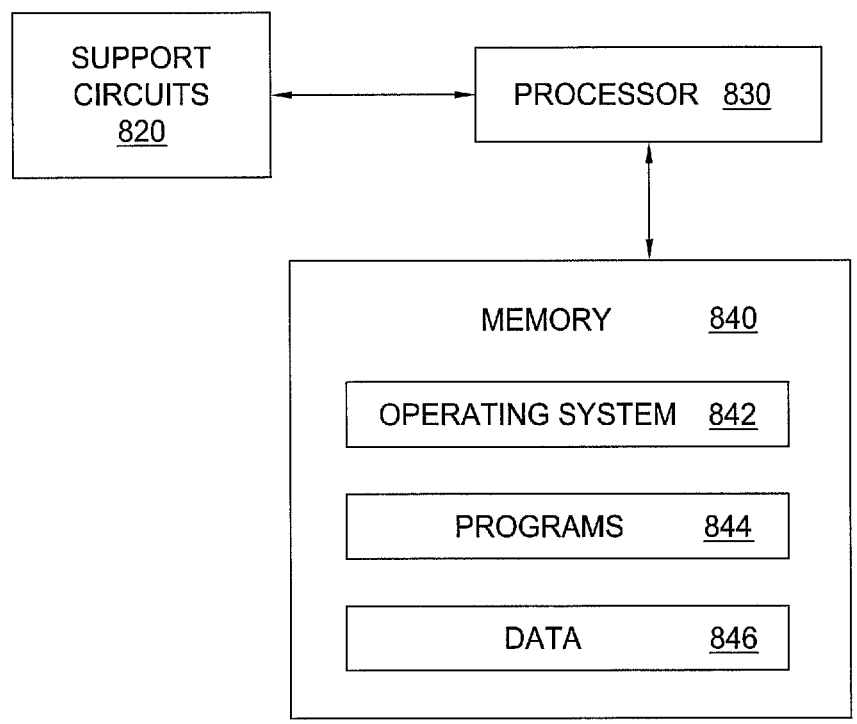
FIG. 8 is a high level block diagram showing a computer. To facilitate understanding, identical reference numerals have been used, where possible, to designate identical elements that are common to the figures.

FIG. 8 is a high level block diagram showing a computer. The computer 800 may be employed to implement embodiments of the present invention. The computer 800 comprises a processor 830 as well as memory 840 for storing various programs 844 and data 846. The memory 840 may also store an operating system 842 supporting the programs 844.

The processor 830 cooperates with conventional support circuitry such as power supplies, clock circuits, cache memory and the like as well as circuits that assist in executing the software routines stored in the memory 840. As such, it is contemplated that some of the steps discussed herein as software methods may be implemented within hardware, for example, as circuitry that cooperates with the processor 830 to perform various method steps. The computer 800 also contains input/output (I/O) circuitry that forms an interface between the various functional elements communicating with the computer 800.

Although the computer 800 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus for authenticating a user transaction with a vendor, a user having a mobile device, the apparatus comprising:
   a memory; and
   a processor communicatively connected to the memory and configured to execute instructions received from the memory, the processor configured to:
      receive, at a mobile service provider, identification information associated with said user and an identifier associated with said mobile device, wherein the received mobile device identifier comprises at least one of a cell phone number, a subscriber identity module (SIM) card number, and an electronic serial number (ESN), and the user identification information comprises one or more of a name and an address of a registered user;
      determine, at the mobile service provider, that the received mobile device identifier and user identification information are associated with a mobile device and a corresponding registered user of the mobile service provider, said registered user being associated with a randomized key string adapted to enable the vendor to authenticate said user after receiving said randomized key string from the mobile device;
      generate and transmit said randomized key string toward the mobile device according to a periodic schedule; and
      transmit said randomized key string toward the vendor in response to receiving from the vendor said mobile device identifier and said user identification information of the registered user of the mobile service provider, said randomized key string transmitted toward said vendor being adapted to enable automatic authentication of said user transaction.

2. The apparatus of claim 1, wherein the processor is configured to transmit said randomized key string in response to receiving said mobile device identifier and user identification information associated with a registered user of the mobile service provider.

3. The apparatus of claim 1, wherein the processor is configured to transmit said randomized key string to said mobile device associated with a registered user of the mobile service provider periodically.

4. The apparatus of claim 1, wherein said randomized key string transmitted toward said vendor is adapted to enable automatic verification of said user.

5. The apparatus of claim 1, wherein the inquirer is one of a vendor, a service provider, or a transaction handler.

6. The apparatus of claim 1, wherein the processor is configured to:
   verify that an owner of a mobile device identified by the mobile device identifier is associated with the other identifying data.

7. The apparatus of claim 1, wherein the processor is configured to:
   receive the name and the mobile device identifier; and
   verify that an owner of the mobile device identified by the mobile device identifier is associated with the received name.

8. The apparatus of claim 1, wherein the processor is configured to:
   send a data string to both the inquirer and the mobile device identified by the mobile device identifier.

9. The apparatus of claim 1, wherein the processor is configured to transmit the randomized key string toward the vendor and the mobile device upon determining the match between the received and determined other identifying data.

10. An apparatus for authenticating a user transaction with a vendor, a user having a mobile device, the apparatus comprising:
   a memory; and
   a processor communicatively connected to the memory and configured to execute instructions received from the memory, the processor configured to:
      transmit, by the vendor, toward a mobile service provider, identification information associated with said user and an identifier associated with said mobile device, wherein the received mobile device identifier comprises at least one of a cell phone number, a subscriber identity module (SIM) card number, and an electronic serial number (ESN), and the user identification information comprises one or more of a name and an address of a registered user;

receive, by the vendor, a first data string comprising a randomized key string sent by the mobile service provider in response to receiving from the vendor said mobile device identifier and said user identification information of the registered user of the mobile service provider and determining that the received mobile device identifier and user identification information are associated with a mobile device and a corresponding registered user of the mobile service provider; and receive, by the vendor, a second data string comprising said randomized key string from the mobile device, wherein a match between the first and the second data strings comprising said randomized key string indicates authenticity of the user participating in the transaction, said randomized key string being assigned to the user and adapted to enable the vendor to automatically authenticate said user, said randomized key string being generated and transmitted by the mobile service provider toward the mobile device according to a periodic schedule.

11. The apparatus of claim 10, wherein the processor is configured to transmit said randomized key string in response to receiving said mobile device identifier and user identification information associated with a registered user of the mobile service provider.

12. The apparatus of claim 10, wherein the processor is configured to transmit said randomized key string to said mobile device associated with a registered user of the mobile service provider periodically.

13. The apparatus of claim 10, wherein said randomized key string transmitted toward said vendor is adapted to enable automatic verification of said user.

14. The apparatus of claim 10, wherein the inquirer is one of a vendor, a service provider, or a transaction handler.

15. The apparatus of claim 10, wherein the processor is configured to:
   verify that an owner of a mobile device identified by the mobile device identifier is associated with the other identifying data.

16. The apparatus of claim 10, wherein the processor is configured to:
   receive the name and the mobile device identifier; and
   verify that an owner of the mobile device identified by the mobile device identifier is associated with the received name.

17. The apparatus of claim 10, wherein the processor is configured to:
   send a data string to both the inquirer and the mobile device identified by the mobile device identifier.

18. The apparatus of claim 10, wherein the processor is configured to transmit the randomized key string toward the vendor and the mobile device upon determining the match between the received and determined other identifying data.

* * * * *